Feb. 9, 1937. A. R. GLANCY ET AL 2,069,756
HINGING MEANS
Filed Sept. 11, 1935
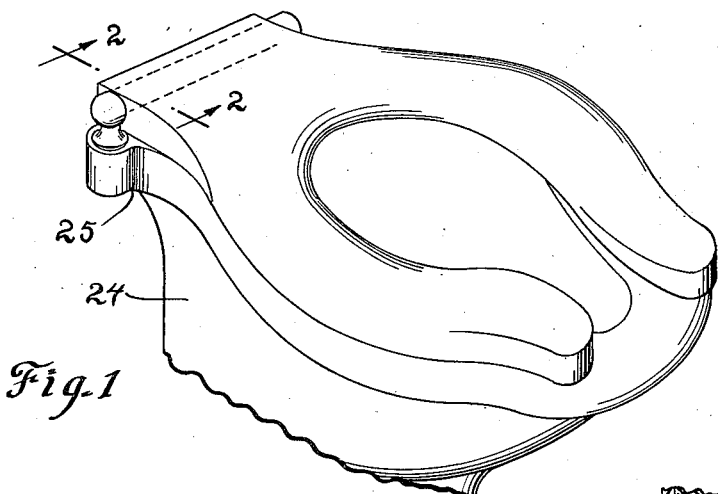
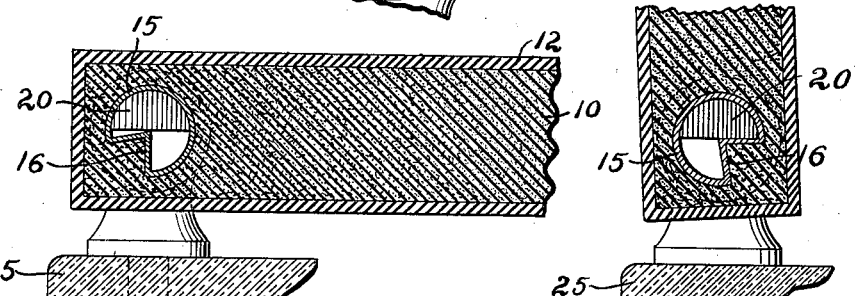
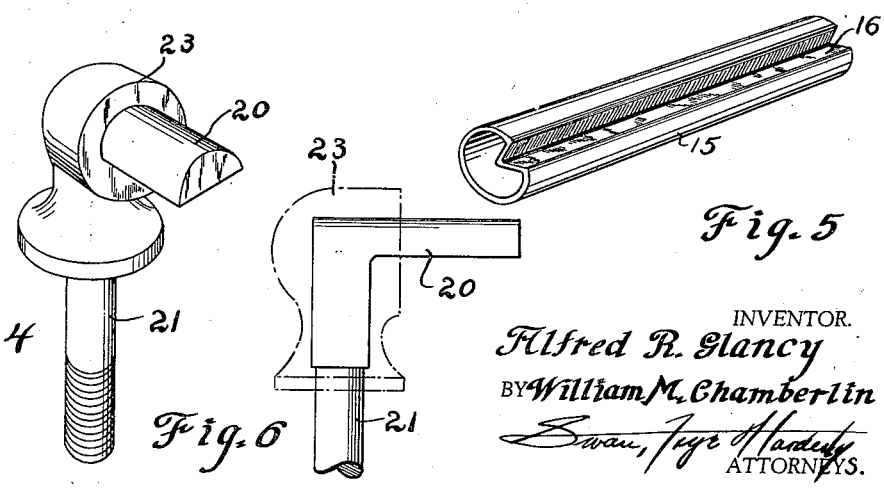
INVENTOR.
Alfred R. Glancy
BY William M. Chamberlin
Swan, Faye Hardey
ATTORNEYS.

Patented Feb. 9, 1937

2,069,756

UNITED STATES PATENT OFFICE 2,069,756

HINGING MEANS

Alfred R. Glancy and William M. Chamberlin, Plymouth, Mich.

Application September 11, 1935, Serial No. 40,028

5 Claims. (Cl. 4—236)

This invention relates to the construction and pivotal support of molded articles, particularly articles of substantial size which are molded of non-metallic composition. Particular utility is found in the application of the invention to articles which may be called upon to withstand abuse and hard usage, yet should remain of sanitary character, neat appearance and impervious to moisture, such as the seats and covers of water-closets and the like. The invention aims to simplify the construction, lighten the weight, decrease the perviousness as well as the chances of breakage and deterioration of such molded articles, and to provide hinging means of great strength and simplicity, incorporating improved automatic stop means limiting swinging movement of the hinged object, wherein the hinging means itself is concealed, yet the bearing surface is extremely large and wear consequently reduced to a minimum.

Other objects and advantages will be apparent from the following description wherein reference is made to the accompanying drawing illustrating a preferred embodiment of the invention and wherein similar reference numerals designate similar parts throughout the several views.

In the drawing:

Figure 1 is a fragmentary perspective view of a water closet provided with a seat and hinge construction incorporating the invention;

Figure 2 is a fragmentary cross-section taken substantially on the line 2—2 of Figure 1 and looking in the direction of the arrows;

Figure 3 is a fragmentary section similar to Figure 2, showing the seat swung to a different position;

Figures 4 and 5 are detailed perspectives of hinging elements; and

Figure 6 is an elevational view of one of the hinging elements, indicating in dot-dash lines the arrangement of the molded casing body thereupon.

Referring now to the drawing, it will be seen upon inspection of Figures 2 and 3 that the body of the seat comprises a core portion 10 over which is molded a surface or casing portion 12. The core portion is first formed and partially cured in a mold of appropriate size and proportions, and is comprised of blown rubber of such composition that after the curing it is of porous but relatively hard nature. In the initial mold, however, the curing of the core is not completed, but is stopped a sufficient time before its completion so that the curing of the core will be properly completed during the curing of the outer coating 12. The latter is arranged thereover after the completion of such first step of the process (the partial curing of the core to the proper degree). The case 12 is of dense rubber, and is of course not blown or expanded.

After enclosure of the core in the encasing portion 12 the assembly is cured under conditions which both properly cure the case and at the same time complete the curing of the core, as is more fully set forth in the copending application of Gustavus B. Mix covering such process, Serial No. 40,029, filed September 11, 1935. The second curing effects vulcanization of the dense outer coating to the sponge rubber core, so that they are permanently bonded together, and it will be appreciated that the surfacing material, being of impervious nature, is capable of taking a high polish.

The seat construction shown incorporates at its rear extremity a partly cylindrical tube 15, molded into and in the shown instance extending entirely across the reduced back portion of the seat, thus providing an opening at each side into which the hinge pintles 20 may project. The tube 15 will be seen to be provided with an angular reentrant or infolded portion 16 which constitutes an abutment adapted to limit swinging movement of the seat by engagement with the flat surfaces of the semi-cylindrical pintle portions 20. The molding of the material of the seat into the angular recess formed in the exterior of the tube by the infolded portion 16 locks the tube firmly in place and against rotation with respect to the seat. The hinge elements are shown as of inverted L shape, and secured to the rearwardly projecting flange portion 25 of the bowl 24 by means of nuts 22 fitted over their downwardly extending stem portions 21. Over the body portion may be molded an encasing body of rubber or the like of appropriate contour, adapted to conform to the appearance of the seat. Such molded casing is designated 23, and it will be seen that the horizontal semi-cylindrical pintle or pivot portion 20 extends laterally therefrom at the proper point to extend into the hinge tube 15 when the parts are assembled in the manner indicated in Figure 1.

What we claim is:

1. Hinging means for a molded article, comprising a partly cylindrical tube, having a reentrant portion, embedded in such article and having an open end accessible at a surface of said article, and a partly cylindrical pintle element rotatably interfitted with said tube.

2. Hinging means for a molded article comprising a tubular element of generally cylindrical form, having a sector-shaped re-entrant portion, embedded in such article and having an open end accessible at one surface of said article, and a cooperatively shaped pintle element rotatably interfitted with said tube.

3. Hinging means for a molded article comprising a partly cylindrical tube having a deformed portion and embedded in such article, said tube having an end open and accessible from one surface of said article, and a partly cylindrical pintle rotatably interfitted with the tube and of lesser circumferential extent than the cylindrical portion of the tube, whereby the internal surface of the deformed portion limits rotation of one relatively to the other, and the external surface of such deformed portion locks the tube against rotation with respect to the material of which the article is molded.

4. Hinging means for a molded article comprising a partly cylindrical tube element embedded in such article and having a sector shaped portion reentrant with respect to the circumferentially extended surface of the cylindrical portion, said tube element having an end open and accessible from a surface of said article, and a partly cylindrical pintle element rotatably extending into said open end of the tube element substantially coaxially with respect to the cylindrical portion of the latter, the cylindrical portion of the pintle element being of lesser circumferential extent than that of the tube element, whereby said reentrant portion limits the extent of rotation of one of these elements relatively to the other, and the engagement of the material of which the article is molded locks the tube element against undesired rotation therein.

5. Hinging means for molded articles and the like comprising a partly cylindrical tube member secured in such article and held against rotation by the cooperation of the molded material with the noncylindrical portion, and a partly cylindrical pintle element rotatably interfitted with the tube member and having angular lost motion with respect thereto but positively stopped in its relative angular movement by interengagement with the noncylindrical portion of the tube.

ALFRED R. GLANCY.
WILLIAM M. CHAMBERLIN.